(12) United States Patent
Siskoy et al.

(10) Patent No.: US 10,442,459 B2
(45) Date of Patent: Oct. 15, 2019

(54) FAIL OPERATIONAL CONTROL OF STEER-BY-WIRE SYSTEM WITHOUT MECHANICAL BACKUP CONNECTION

(71) Applicant: GM GLOBAL TECHNOLOGY OPERATIONS LLC, Detroit, MI (US)

(72) Inventors: Brian N. Siskoy, Berkley, MI (US); Scott R. Kloess, Rochester Hills, MI (US); Hossam Almasri, Troy, MI (US); Silviu A. Popescu, Ajax (CA); Ibrahim A. Badiru, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 117 days.

(21) Appl. No.: 15/643,584

(22) Filed: Jul. 7, 2017

(65) Prior Publication Data

US 2019/0009813 A1   Jan. 10, 2019

(51) Int. Cl.
*B62D 5/00* (2006.01)
*B62D 5/04* (2006.01)
*B60R 16/023* (2006.01)
*B60R 16/03* (2006.01)

(52) U.S. Cl.
CPC .......... *B62D 5/003* (2013.01); *B60R 16/0238* (2013.01); *B60R 16/03* (2013.01); *B62D 5/006* (2013.01); *B62D 5/0484* (2013.01)

(58) Field of Classification Search
CPC .. B62D 5/003; B62D 5/0484; B60R 16/0238; B60R 16/03
See application file for complete search history.

(56) References Cited

U.S. PATENT DOCUMENTS

| 6,776,252 | B1 * | 8/2004 | Andonian | B62D 5/001 180/402 |
|---|---|---|---|---|
| 7,004,279 | B2 * | 2/2006 | Shitamitsu | B62D 5/003 180/402 |
| 7,127,341 | B2 * | 10/2006 | Whang | B62D 5/003 701/43 |
| 7,322,439 | B2 * | 1/2008 | Hara | B62D 1/163 180/402 |
| 7,698,035 | B2 * | 4/2010 | Chino | B62D 5/005 180/204 |
| 7,900,742 | B2 * | 3/2011 | Kubokawa | B62D 1/163 180/402 |
| 8,185,270 | B2 * | 5/2012 | Hayama | B62D 1/163 180/402 |
| 9,376,107 | B2 * | 6/2016 | Suzuki | B60T 8/1755 |
| 9,399,484 | B2 * | 7/2016 | Katayama | B62D 5/003 |

(Continued)

*Primary Examiner* — Joseph M Rocca
*Assistant Examiner* — Michael R Stabley
(74) *Attorney, Agent, or Firm* — Cantor Colburn LLP

(57) ABSTRACT

A vehicle and a steering system of a vehicle. The steering system includes a steering column emulator that generates an electrical driving signal in response to a driver input, a steering rack assembly that receives the electrical driving signal from the steering column emulator and controls steering of the vehicle as indicated by the received signal, and a backup system. The backup system provides a backup electrical driving signal to the steering rack assembly upon a failure of the steering column emulator, and the steering rack assembly steers the vehicle as indicated by the backup electrical driving signal upon the failure of the steering column emulator.

19 Claims, 2 Drawing Sheets

(56) References Cited

U.S. PATENT DOCUMENTS

| | | | |
|---|---|---|---|
| 9,434,404 B2* | 9/2016 | Kuramochi | B62D 5/003 |
| 9,637,167 B2* | 5/2017 | Miyasaka | B62D 5/003 |
| 9,643,642 B2* | 5/2017 | Kuramochi | B62D 5/003 |
| 9,751,555 B2* | 9/2017 | Sekiya | B62D 5/0409 |
| 9,764,759 B2* | 9/2017 | Becker | B62D 5/001 |
| 2006/0042858 A1* | 3/2006 | Boyle | B62D 5/003 |
| | | | 180/402 |
| 2014/0172236 A1* | 6/2014 | Nishikawa | B62D 5/003 |
| | | | 701/42 |
| 2015/0090519 A1* | 4/2015 | D'Amato | B62D 5/0409 |
| | | | 180/446 |
| 2015/0321692 A1* | 11/2015 | Kuramochi | B62D 5/003 |
| | | | 701/43 |
| 2016/0068182 A1* | 3/2016 | Becker | B62D 5/001 |
| | | | 180/403 |
| 2016/0159388 A1* | 6/2016 | Sekiya | B62D 5/0409 |
| | | | 180/446 |

* cited by examiner

FAIL OPERATIONAL CONTROL OF STEER-BY-WIRE SYSTEM WITHOUT MECHANICAL BACKUP CONNECTION

INTRODUCTION

The subject disclosure relates to a steer-by-wire system for steering a vehicle and, in particular, to an electrical backup system to a steer-by-wire system that operates using electrical signals.

A traditional steering system for a vehicle includes a steering column that is mechanically connected to a steering rack assembly by an intermediate shaft (I-shaft) in order to transfer a torque or rotation at the steering wheel to the steering rack assembly. A steer-by-wire system performs steering by communicating electrical signals between a steering column emulator and a steering rack assembly. The steering column emulator converts a measured rotation of a steering wheel to an electrical signal and provides the electrical signal to the steering rack assembly which operates a device to perform a mechanical action corresponding to the rotation of the steering wheel. Since the mechanical connection between a steering column and steering rack assembly serves as a reliable backup in the event of an electrical failure of the steering column emulator, such traditional components are still used alongside the steer-by-wire system. Thus the possible benefits of steer-by-wire system, such as a reduced need for certain mechanical parts, lighter load, increased fuel economy, etc., have yet to be achieved. Accordingly, it is desirable to provide a steer-by-wire system that can operate in the event of a failure of a steering column emulator without using the traditional mechanical connection.

SUMMARY

In an exemplary embodiment, a steering system of a vehicle is disclosed. The steering system includes a steering column emulator that generates an electrical driving signal in response to a driver input, a steering rack assembly that receives the electrical driving signal from the steering column emulator and controls steering of the vehicle as indicated by the received signal, and a backup system. The backup system provides a backup electrical driving signal to the steering rack assembly upon a failure of the steering column emulator, and the steering rack assembly steers the vehicle as indicated by the backup electrical driving signal upon the failure of the steering column emulator. The steering rack assembly and the steering column emulator are mechanically disconnected.

The backup system includes a backup sensor that determines an angle of rotation of a steering column at the steering column emulator and transmits the angle of rotation to the steering rack assembly. The backup sensor is powered by the steering rack assembly. Determining the angle of rotation of the steering column at the backup sensor allows for operation of the steering column emulator in a fail-safe mode.

The system further includes a rack position sensor, wherein the steering rack assembly compares a forward road wheel angle measured at the rack position sensor to the measured angle of rotation of the steering column to steer the vehicle.

The steering column emulator provides the electronic driving signal over a first private bus to the steering rack assembly and a redundant electronic driving signal over a second private bus to the steering rack assembly. The wires of the first private bus are bundled separately from wires of the second private bus. The steering rack assembly includes a redundant circuit for controlling the steering of the vehicle, wherein the redundant circuit receives the redundant electronic driving signal from the steering column emulator. A vehicle controller area network (CAN) provides a further backup communication channel between the steering column emulator and the steering rack assembly.

The system further includes a backup power supply that provides power to the steering rack assembly. The backup power supply provides power to the steering rack assembly via a harness that is separate from a harness for the primary power supply.

In another exemplary embodiment, a vehicle is disclosed. The vehicle includes a steering column emulator that generates an electrical driving signal in response to a driver input, a steering rack assembly that receives the electrical driving signal from the steering column emulator and controls steering of the vehicle as indicated by the received signal, and a backup system. The backup system provides a backup electrical driving signal to the steering rack assembly upon a failure of the steering column emulator, and the steering rack assembly steers the vehicle as indicated by the backup electrical driving signal upon the failure of the steering column emulator. The steering rack assembly and the steering column emulator are mechanically disconnected.

The backup system includes a backup sensor that determines an angle of rotation of a steering column at the steering column emulator and transmits the angle of rotation to the steering rack assembly. The backup sensor is powered by the steering rack assembly.

The steering column emulator provides the electronic driving signal over a first private bus to the steering rack assembly and a redundant electronic driving signal over a second private bus to the steering rack assembly. The wires of the first private bus are bundled separately from wires of the second private bus. The steering rack assembly includes a redundant circuit for controlling the steering of the vehicle, wherein the redundant circuit receives the redundant electronic driving signal from the steering column emulator. A vehicle controller area network (CAN) of the vehicle provides a backup communication channel between the steering column emulator and the steering rack assembly.

The vehicle further includes a backup power supply dedicated to powering the steering rack assembly, wherein the backup power supply provides power to the steering rack assembly via a harness separate from a harness for the primary power supply.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
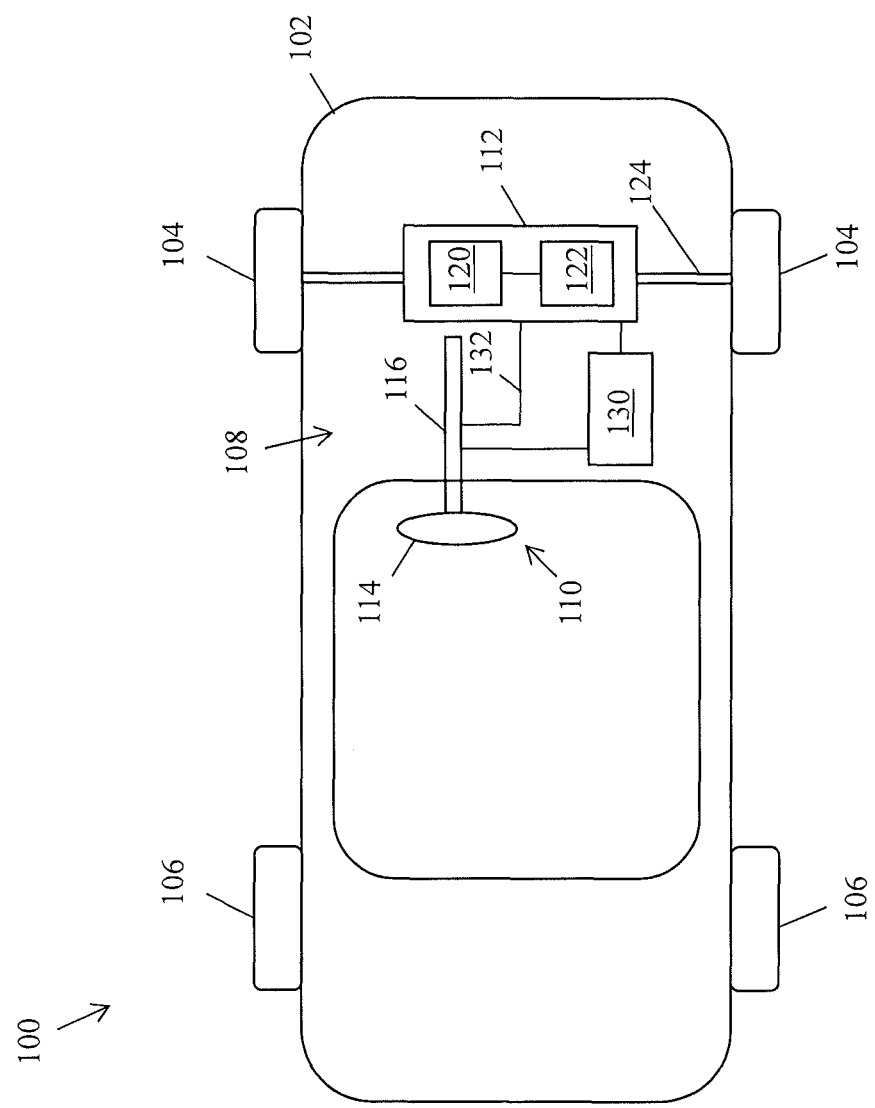
FIG. 1 illustrates a schematic plan of a vehicle that uses a steer-by-wire system to steer the vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 illustrates a plan view of a vehicle 100 that uses a steer-by-wire system 108 to steer the vehicle 100. The vehicle includes a frame 102 with road wheels, which may include two forward road wheels 104 and two rear road wheels 106. A steer-by-wire system 108 is used to change a direction of the forward road wheels 104 with respect to the frame 102 of the vehicle 100, thereby steering the vehicle 100. The steer-by-wire system 108 includes a steering column emulator 110 and a steering rack assembly 112. The steering column emulator 110 includes a steering wheel 114 connected to a steering column 116 that is contained with a housing. The steering column emulator 110 emulates the experience of driving and steering the vehicle 100 to the driver. As the driver rotates the steering wheel 114, the attached steering column 116 rotates and the angle of rotation is measured by various sensors. The steering column emulator 110 includes circuitry, such as a processor, that records the rotation of the steering column 116, determines an angle of rotation of the steering column and generates an electrical steering signal indicative of the degree of rotation of the steering column 116. The electrical signal can then be provided to the steering rack assembly 112 over a communication link 132, such as a conductive wire.

The steering rack assembly 112 includes a circuitry 120 that receives the electrical signal from the steering column emulator 110 and performs an action that is indicated by the electrical signal. For example, the angle of rotation at the steering column 116 generates a steering signal at the steering column emulator 110 and the steering rack assembly 112 changes a road angle of the forward road wheel 104 with respect to the frame of the vehicle 100 in response to the steering signal. The extent of the road angle corresponds to the angle of rotation of the steering column 116 and is indicated by signal generated by the rotation of the steering column 116. The steering rack assembly 112 includes circuitry 120 that receives the electrical signal from the steering column emulator 110 and that activates an actuator 122 that produces the road angle indicated by the electrical signal. The circuitry 120 which may include a processor. The actuator 122 of the steering rack assembly 112 is mechanically connected to a steering rack 124 and is suitable for changing the wheel orientation or road angle.

It is to be noted that the steering column emulator 110 and the steering rack assembly 112 are not mechanically connected to each other. In other words, a force or torque applied to the steering column 116 is not mechanically transferred to the steering rack assembly 112. Rather, the electrical signal generated by rotation of the steering column 116 is provided to the steering rack assembly 112 and the actuator 122 at the steering rack assembly 112 generates the mechanical force for steering the vehicle 100 in response to the electrical signal.

The steer-by-wire system 108 further includes a backup steering system 130 that provides instructions to the steering rack assembly 112 in the event of a failure of the steering column emulator 110 or in the event of failure of a communication line between the steering column emulator 110 and the steering rack assembly 112. The backup steering system 130 provides backup electrical steering signals to the steering rack assembly 112 in order to generate an action at the steering rack assembly 112. The backup steering system 130 is not mechanically connected to the steering rack assembly 112. In other words, a force is not transferred mechanically from the backup-steering system 130 to the steering rack assembly 112. Instead, the backup steering system 130 communicates backup electrical steering signals to the steering rack assembly 112 and the steering rack assembly 112 generates an action corresponding to the backup electrical steering signals in order to steering the vehicle 100.

Figure 2:
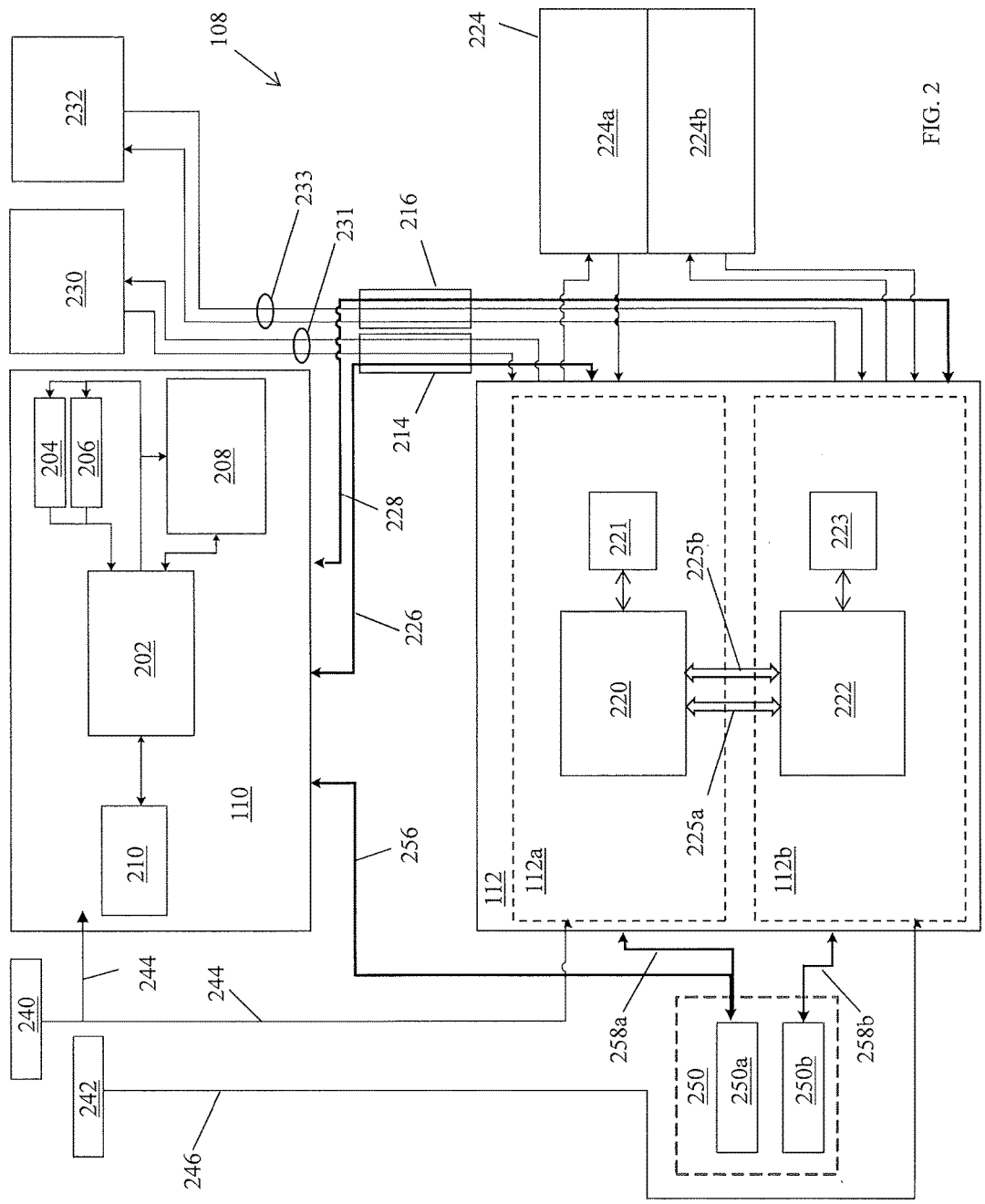
FIG. 2 shows a detailed schematic diagram illustrating the electronics of the steer-by-wire system, according to an exemplary embodiment.

FIG. 2 shows a detailed schematic diagram illustrating the electronics of the steer-by-wire system 108, according to an exemplary embodiment. The steer-by-wire system 108 includes the steering column emulator 110, the steering rack assembly 112, a primary power supply 240, a rack position sensor 224 (including a first rack position sensor 224a and a second rack position sensor 224b), a vehicle controller area network (CAN) 250 and various components of the backup system, including, in part, backup angle and torque sensors 230 and 232, and a backup or secondary power supply 242.

The steering column emulator 110 includes an electronic control unit (ECU) 202 that performs various programs for emulating a driving experience for the driver of the vehicle 100. The steering column emulator 110 includes an angle sensor 204 for measuring an angle of rotation of the steering column 116 and a torque sensor 206 that measures a torque applied to the steering column 116. The angle and torque measurements are sent to the ECU 202 for processing. The steering column emulator 110 further includes a motor position sensor 210 for determining a motor state. An electronic steering column lock 208 is used as an anti-theft device to engage and/or disengage the steering column 116. The ECU 202 receives the angle measurement from the angle sensor 204 and the torque measurement from the torque sensor 206 and communicates these measurements to the steering rack assembly 112.

The steering rack assembly 112 steers the vehicle 100 according to the angle and torque measurements sent to the steering rack assembly 112 from the steering column emulator 110. The steering rack assembly 112 includes a first steering circuit 112a and a second steering circuit 112b that serves as a redundant circuit to the first steering circuit 112a.

The first steering circuit 112a includes a first steering rack electric control unit (ECU) 220 that processes signals and a first actuator 221 that generates mechanical motion of the steering rack 124 and associated forward road wheels 104. The ECU 220 of the first steering circuit 112a communicates with the ECU 202 of the steering column emulator 110. The ECU 202 of the steering column emulator 110 transmits steering column angle and torque signals to the ECU 220 of the first steering circuit 112a. In response, the ECU 220 provides steering signals to the first actuator 221 in order to control steering of the vehicle. The first rack position sensor 224a determines an initial position of the steering rack 124 indicative of an angle of the forward road wheels 104 with respect to forward alignment. A first motor position sensor associated with the first rack actuator 221 tracks motion of the steering rack to provide feedback to the first steering circuit 112a. The ECU 220 receives feedback signals from the first motor position sensor to track motion of the steering rack in order to provide correct steering. In addition, the ECU 220 of the first steering circuit 112a determines force and torque applied at the steering rack and transmits these signals corresponding to the force, torque and position to the steering column emulator 110. The ECU 202 of the steering column emulator 110 can use the received force, torque and position to simulate a "road-feel" to the driver at the steering wheel 114.

The second steering circuit 112b includes a second steering rack electric control unit (ECU) 222 that performs the same functions as the first ECU 220 of first steering circuit 112a. The second steering circuit 112b further includes a second actuator 223 that generates mechanical motion of the steering rack 124 and associated forward road wheels 104 to provide steering. Second rack position sensor 224b determines an initial position of the steering rack 124 indicative of an angle of the forward road wheels 104 with respect to forward alignment. A second motor position sensor associated with the second rack actuator 223 tracks motion of the steering rack and provides a corresponding feedback signal to the second ECU 222. The second steering circuit 112b determines force and torque applied at the steering rack and transmits signals corresponding to the force, torque and position to the steering column emulator 110. The steering column emulator 110 can use these signals to simulate road-feel to the driver. The second steering circuit 112b, its second ECU 222, second actuator 223 and the second rack position sensor 224b are redundant elements to the corresponding elements of the first steering circuit 112a. These elements are run in parallel with the corresponding elements of the first steering circuit 112a. In the event of failure of the first steering circuit 112a, the second steering circuit 112b serves as a backup the first steering circuit 112a. First and second steering circuits 112a and 112b are designed to operate in parallel such that each ECU (220 and 222) is controlling one half of the output at a selected time. As shown by arrows 225a and 225b, information can be shared back and forth between the first ECU 220 and the second ECU 222 in order to ensure proper functioning of the steering rack assembly 112 in case of a failure of individual elements of the steering rack assembly 112. Shared information is also provided on redundant communication paths, i.e., communication paths shown by arrows 225a and 225b.

The first steering circuit 112a and the second steering circuit 112b communicate with the steering column emulator 110 over separate communication channels. A first private bus 226 provides a first communication channel between the steering column emulator 110 and the first steering circuit 112a of the steering rack assembly 112. A second private bus 228 provides a second communication channel between the steering column emulator 110 and the second steering circuit 112b of the steering rack assembly 112.

The backup system to the steer-by-wire system provides electrical driving signals to the steering rack assembly 112 in case of a failure of the steering column emulator 110 or of a failure of one or more of the first private bus 226 and second private bus 228. The backup system includes first backup angle and torque sensors 230 for measuring the steering angle and torque applied to the steering column 116 and second backup angle and torque sensors 232 that provides redundant measurements for the first backup angle and torque sensors 230. The first backup angle and torque sensors 230 and the second backup angle and torque sensors 232 are powered independently of the steering column emulator 110. Instead, these backup sensors (230 and 232) receive their power over a power line from the steering rack assembly 112. Therefore these backup sensors (230 and 232) are able to provide steering angle and torque measurements to the steering rack assembly 112 in the event that power is lost at the steering column emulator 110.

First backup angle and torque sensors 230 provides angle and torque measurements to the first steering circuit 112a of the steering rack assembly 112 over first communication wires 231. The second backup angle and torque sensors 232 provides angle and torque measurements to the second steering circuit 112b of the steering rack assembly 112 over second communication wires 233. The second backup angle and torque sensors 232 thereby provides redundant measurements to the steering rack assembly 112 and provides these measurements over redundant communication wires. The presence of the first and second backup angle and torque sensors 230 and 232 allows the steering column emulator 110 to be able to operate in a fail-safe mode as well as a fail-operational mode. In a fail-operational mode, the steering column emulator 110 is able to operate even though a component of the steering column emulator 110 has failed. This is generally provided by having redundant components (not shown) in the steering column emulator 110. In a fail-safe mode, upon a failure of the steering column emulator 110, the backup sensors 230 and 232 are able to make steering column measurements and provide the measurements to the steering rack assembly to maintain steering capabilities. The backup sensors 230 and 232 therefore provide the ability to provide either a fail-operational mode or a fail-safe mode to operation of the steering column emulator 110.

The rack position sensor 224 measures the angle of the forward road wheel 104. The steering rack assembly 112 compares the measured angle of the forward road wheel 104 to an angle of the steering column 116 measured by the first and second backup angle and torque sensors (230 and 232) in order to ensure that the angle of the forward road wheels 104 is consistent with the angle of the steering column 116. In an embodiment, the ECU 220 compares the angle measured at the first backup angle and torque sensor 230 to the road wheel angle measured at the first rack position sensor 224a, and ECU 222 compares the angle measured at the second backup angle and torque sensor 232 to the road wheel angle measured at the second rack position sensor 224b.

The wires of the first private bus 226 are bundled with the communication wires 231 of the first backup angle and torque sensors 230 in a first harness 214. Similarly, the wires of the second private bus 228 are bundled with the communication wires 233 of the second backup angle and torque sensors 232 in a second harness 216. Each of these wire bundles are physically separated from each other, so that a physical impairment occurring at the location of one bundle of wires does not affect the wires of the other bundle. This physical separation between the wires of first harness 214 and wires of second harness 216 provides an extra protection against a communication failure between the steering column emulator 110 and the steering rack assembly 112.

In addition, a public bus 256 of the vehicle controller area network (CAN) 250 can be used to provide signals back and forth between the steering column emulator 110 and the steering rack assembly 112 in the event of failure of one or more of the first private bus 226 and the second private bus 228. The vehicle CAN 250 provides a network for controlling the various electrical components of the vehicle, such as electrical lock, windshield wipers, mirror adjusters, etc. The public bus 256 provides signals from the steering column emulator 110 to the vehicle CAN 250. The vehicle CAN 250 includes a primary vehicle CAN 250a and a secondary vehicle CAN 250b that provides redundancy to the primary vehicle CAN 250a to serve as a backup in the event of failure of the primary vehicle CAN 250a. A communication wire 258a extends from the primary vehicle CAN 250a to the first steering circuit 112a to provide communication between the steering column emulator 110 and with the first steering circuit 112a via the public bus 256, primary vehicle CAN 250a and communication wire 258a. Similarly, communication wire 258b extends from the secondary vehicle CAN 250b to the second steering circuit 112b to provide communication between the steering column emulator 110 and the second steering circuit 112b via the public bus 256, secondary vehicle CAN 250b and communication wire 258b. Signals that otherwise would be communicated over either the first private bus 226 or the second private bus 228 can thus be sent over the public bus 256.

The back-up system further includes a dual vehicle power supply. A primary power supply 240 or battery provides electrical power to both the steering column emulator 110 and the first steering circuit 112a over a first power harness 244. The secondary or backup power supply 242 provides electrical power to the second steering circuit 112b (i.e. is dedicated to powering the steering rack assembly 112) and provides this power over a second power harness 246. In the event of either a failure of the primary power supply 240 or of a physical break in the first power harness 244, power can be supplied to the steering rack assembly 112 via the secondary power supply 242. The power from the steering rack assembly 112 can then be used to power various elements of the backup system. For example first steering circuit 112a supplies power to first backup angle and torque sensor 230 and second steering circuit 112b supplies power to second backup angle and torque sensor 232.

As a result of the backup system described herein, a steering system is provided that dispenses with a mechanical connection between a steering column and a steering rack. As a result, the steering system includes fewer mechanical parts, leading to a lighter overall vehicle weight and increased fuel economy.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:

1. A steering system of a vehicle, comprising:
    a steering column emulator configured to generate an electrical driving signal in response to a driver input;
    a steering rack assembly configured to receive the electrical driving signal from the steering column emulator and controls steering of the vehicle as indicated by the received signal; and
    a backup system configured to provide a backup electrical driving signal to the steering rack assembly upon a failure of the steering column emulator, wherein the steering rack assembly steers the vehicle as indicated by the backup electrical driving signal upon the failure of the steering column emulator, wherein the backup system includes a backup sensor powered by the steering rack assembly.

2. The system of claim 1, wherein the backup sensor is configured to determine an angle of rotation of a steering column at the steering column emulator and transmits the angle of rotation to the steering rack assembly.

3. The system of claim 2 further comprising a rack position sensor, wherein the steering rack assembly is configured to compare a forward road wheel angle measured at the rack position sensor to the measured angle of rotation of the steering column to steer the vehicle.

4. The system of claim 2, wherein the backup sensor is configured to determine the angle of rotation of the steering column to allow for operation of the steering column emulator in a fail-safe mode.

5. The system of claim 1, wherein the steering column emulator is configured to provide the electronic driving signal over a first private bus to the steering rack assembly and a redundant electronic driving signal over a second private bus to the steering rack assembly.

6. The system of claim 5, wherein wires of the first private bus are bundled separately from wires of the second private bus.

7. The system of claim 5, wherein the steering rack assembly includes a redundant circuit for controlling the steering of the vehicle, wherein the redundant circuit is configured to receive the redundant electronic driving signal from the steering column emulator.

8. The system of claim 1, further comprising a backup power supply configured to provide power to the steering rack assembly.

9. The system of claim 8, wherein the backup power supply is configured to provide power to the steering rack assembly via a harness separate from a harness for the primary power supply.

10. The system of claim 1, wherein a vehicle controller area network (CAN) is configured to provide a backup communication channel between the steering column emulator and the steering rack assembly.

11. The system of claim 1, wherein the steering rack assembly and the steering column emulator are mechanically disconnected.

12. A vehicle, comprising:
    a steering column emulator configured to generate an electrical driving signal in response to a driver input;
    a steering rack assembly configured to receive the electrical driving signal from the steering column emulator and to control steering of the vehicle as indicated by the received signal; and
    a backup system configured to provide a backup electrical driving signal to the steering rack assembly upon a failure of the steering column emulator, wherein the steering rack assembly steers the vehicle as indicated by the backup electrical driving signal upon the failure of the steering column emulator, wherein the backup system includes a backup sensor powered by the steering rack assembly.

13. The vehicle of claim 12, wherein the backup sensor is configured to determine an angle of rotation of a steering column at the steering column emulator and to transmit the angle of rotation to the steering rack assembly.

14. The vehicle of claim 12, wherein the steering column emulator is configured to provide the electronic driving signal over a first private bus to the steering rack assembly and a redundant electronic driving signal over a second private bus to the steering rack assembly.

15. The vehicle of claim 14, wherein wires of the first private bus are bundled separately from wires of the second private bus.

16. The vehicle of claim 15, wherein the steering rack assembly includes a redundant circuit for controlling the steering of the vehicle, wherein the redundant circuit is configured to receive the redundant electronic driving signal from the steering column emulator.

17. The vehicle of claim 12, further comprising a backup power supply dedicated to powering the steering rack assembly, wherein the backup power supply is configured to provide power to the steering rack assembly via a harness separate from a harness for the primary power supply.

18. The vehicle of claim 12, further comprising a vehicle controller area network (CAN), wherein the vehicle CAN is configured to provide a backup communication channel between the steering column emulator and the steering rack assembly.

19. The vehicle of claim 12, wherein the steering rack assembly and the steering column emulator are mechanically disconnected.

* * * * *